Patented Apr. 27, 1926.

1,582,844

UNITED STATES PATENT OFFICE.

ARTHUR LÜTTRINGHAUS, OF MANNHEIM, AND ARTHUR WOLFRAM, OF FRANKFORT-ON-THE-MAIN, GERMANY, ASSIGNORS TO BADISCHE ANILIN- & SODA-FABRIK, OF LUDWIGSHAFEN-ON-THE-RHINE, GERMANY, A CORPORATION OF GERMANY.

VAT COLORING MATTERS.

No Drawing. Application filed June 8, 1925. Serial No. 35,771.

*To all whom it may concern:*

Be it known that we, ARTHUR LÜTTRINGHAUS and ARTHUR WOLFRAM, citizens of the German Empire, residing the first at Mannheim and the second at Frankfort-on-the-Main, Germany, have invented new and useful Improvements in Vat Coloring Matters, of which the following is a specification.

This invention relates to the production of valuable vat coloring matters by the action of aluminium chlorid on naphthanthraquinone. We have found that by the said reaction very valuable vat coloring matters can be obtained by causing the said substances to act on each other at an elevated temperature, but below 210 degrees centigrade, whether in the absence or presence of diluents, or solvents. From the product obtained in this manner, any unaltered naphthanthraquinone is first removed with solvents of low boiling point whereupon a vat dyestuff can be extracted in ample quantities by means of higher boiling organic solvents or by means of alkaline hydrosulfite solution, which dyestuff dissolves in alkaline hydrosulfite solution to give a cherry red vat from which cotton is dyed fast violet blue shades. Various diluents, or solvents may be used especially organic compounds which are not attacked by aluminium chlorid, and phthalic anhydrid is very suitable. Other anhydrous metal chlorids, such for example as sodium or ferric chlorid, may also be added.

The following examples will serve to further illustrate the manner of carrying the invention into practice but the invention is not restricted to these examples. The parts are by weight.

Example 1.

25.8 parts of naphthanthraquinone are intimately mixed with 30 parts of anhydrous aluminium chlorid and heated for several hours to about 200 degrees centigrade. When cool, the mass is treated with dilute hydrochloric acid. The dark residue left undissolved in this treatment is filtered off, washed and dried and then boiled with benzene, glacial acetic acid or other suitable solvents in order to extract any unaltered naphthanthraquinone. The raw dyestuff is then boiled with trichlorobenzene whereby the dyestuff is dissolved to a dark blue solution from which it crystallizes out on concentrating. After filtering, washing and drying it represents a dark violet powder with a slight metallic lustre. In alkaline hydrosulfite solution it dissolves with a cherry-red color. The vat dyes cotton red shades which in the air turn violet blue or blue and have an excellent fastness.

Example 2.

25.8 parts of naphthanthraquinone are intimately mixed while grinding with 15 parts of anhydrous aluminium chlorid and 15 parts of common salt. The mixture is introduced into a melt composed of 65 parts of aluminium chlorid and 95 parts of common salt at about 190 degrees centigrade and is kept at about 200 degrees centigrade for several hours. After cooling, the mass is freed from salts and unaltered naphthanthraquinone in the manner described in the foregoing example and the dyestuff is extracted from the dried remainder by means of hot alkaline hydrosulfite solution. The cherry-red solution is filtered while hot and the filtrate aerated. The dyestuff is hereby precipitated in the form of blue flakes which can be further purified by treating with dilute hypochlorite solution. When dry, the product is a violet-black powder with a strong copper lustre; it dissolves in concentrated sulfuric acid with an olive-green to green coloration; by pouring into water the dyestuff is again precipitated in blue flakes. In boiling benzene it dissolves in traces with a light blue color, in boiling trichlorobenzene to a greater degree giving a blue solution, both solutions exhibiting a strong red fluorescence. Cotton is dyed from the cherry-red fluorescent vat red shades which in the air are converted into a very fast blue of reddish tinge.

Other metal chlorids, for example sublimed ferric chlorid may be added to the melt, the speed of the reaction or the yield being thereby improved in some cases.

Derivatives of naphthanthraquinone, for example, halogen-naphthanthraquinone, such, for example, as the chloro-naphthanthraquinone obtainable by condensing β-chloro phthalic anhydrid with naphthalene may be employed, the latter furnishing a violet blue or blue vat dyestuff of the same character as does naphthanthraquinone itself.

*Example 3.*

40 parts of naphthanthraquinone and 200 parts of phthalic anhydrid are fused in a covered vessel and heated to about from 160 to 165 degrees (temperature of the melt). 200 parts of aluminium chlorid are then introduced rather quickly and heating to about 165 degrees is continued for about one and a half hours. After cooling, the mass is decomposed with water and boiled therewith and the phthalic acid extracted thereby may be recovered in a suitable manner. The residue is dissolved by means of an alkaline hydrosulfite solution and filtered to be freed from a very small amount of undissolved matter. The vat is aerated whereby a mixture of vat dyestuff and unaltered naphthanthraquinone is separated. This mixture is dried, powdered and boiled with a suitable solvent, for example benzene or acetone which leaves the dyestuff undissolved. It can be crystallized in the form of needles from nitrobenzene. As for its properties, reference is made to the foregoing examples.

What we claim is:

1. As a new article of manufacture, vat coloring matters derived from naphthanthraquinone which coloring matters dissolve in concentrated sulfuric acid with an olive green to green color, and are difficultly soluble in benzene, toluene and trichlorobenzene giving blue solutions exhibiting a strong red fluorescence, and which dissolve in alkaline hydrosulfite solution giving a cherry-red vat from which cotton is dyed fast violet blue shades.

2. A process of manufacturing vat coloring matters which consists in heating a naphthanthraquinone body with aluminium chlorid to an elevated temperature but below 210 degrees centigrade.

3. A process of manufacturing vat coloring matters which consists in heating naphthanthraquinone with aluminium chlorid and phthalic anhydrid to an elevated temperature but below 210 degrees centigrade.

4. A process of manufacturing vat coloring matters which consists in heating a naphthanthraquinone body with aluminium chlorid to an elevated temperature but below 210 degrees centigrade and separating from the product unaltered naphthanthraquinone and other bodies.

In testimony whereof we have hereunto set our hands.

ARTHUR LÜTTRINGHAUS.
ARTHUR WOLFRAM.